(12) United States Patent
Naruse

(10) Patent No.: US 6,677,404 B1
(45) Date of Patent: Jan. 13, 2004

(54) LIGHT-DIFFUSING RESIN COMPOSITION

(75) Inventor: Fumihiro Naruse, Kawasaki (JP)

(73) Assignee: Zeon Corporation, Tokyo (JP)

( * ) Notice: Subject to any disclaimer, the term of this patent is extended or adjusted under 35 U.S.C. 154(b) by 22 days.

(21) Appl. No.: 10/110,789

(22) PCT Filed: Nov. 6, 2000

(86) PCT No.: PCT/JP00/07781

§ 371 (c)(1),
(2), (4) Date: Apr. 30, 2002

(87) PCT Pub. No.: WO01/32774

PCT Pub. Date: May 10, 2001

(30) Foreign Application Priority Data

Nov. 5, 1999 (JP) .............................. 11-315070

(51) Int. Cl.[7] .......................... C08L 57/00; C08L 10/00; G02B 5/00
(52) U.S. Cl. ....................... 525/192; 525/216; 525/222; 525/241
(58) Field of Search ................................ 525/192, 216, 525/222, 241

(56) References Cited

U.S. PATENT DOCUMENTS

| | | | | |
|---|---|---|---|---|
| 3,992,486 A | * | 11/1976 | Lang .......................... | 525/208 |
| 5,498,670 A | * | 3/1996 | Aoyama et al. ............. | 525/217 |
| 6,365,660 B1 | * | 4/2002 | Suzuki et al. ............... | 524/437 |

FOREIGN PATENT DOCUMENTS

| | | |
|---|---|---|
| JP | 05-281403 | 10/1993 |
| JP | 06-107881 | 4/1994 |
| JP | 08-199046 | 8/1996 |
| JP | 08-327806 | 12/1996 |
| JP | 2000-048608 | 2/2000 |
| JP | 2000-169521 | 6/2000 |

OTHER PUBLICATIONS

International Search Report dated Jan. 30, 2001.

* cited by examiner

*Primary Examiner*—Nathan M. Nutter
(74) *Attorney, Agent, or Firm*—Armstrong, Kratz, Quintos, Hanson & Brooks, LLP

(57) ABSTRACT

A light-diffusing resin composition comprising at least one alicyclic structure-containing resin (A) selected from the group consisting of (co)polymers (A1) having repeating units derived from an alicyclic structure-containing ethylenically unsaturated monomer and (co)polymers (A2) having repeating units which are derived from an aromatic vinyl monomer and in which the aromatic rings have been converted to alicyclic structures through hydrogenation after polymerization and transparent fine polymer particles (B), and a light-diffusing molded or formed resin obtained by molding or forming the resin composition.

20 Claims, No Drawings

LIGHT-DIFFUSING RESIN COMPOSITION

TECHNICAL FIELD

The present invention relates to a light-diffusing resin composition excellent in both light transmission property and light diffusion property and moreover in light resistance. The present invention also relates to light-diffusing molded or formed products obtained by molding or forming the light-diffusing resin composition into various molded or formed products such as sheets (plates).

BACKGROUND ART

Light-diffusing molded or formed products of a synthetic resin having light diffusion property are used in application fields of, for example, illumination covers, light-diffusing members (light-diffusing plates) for light sources in internally illuminating type displays and liquid crystal displays, etc. The light-diffusing molded or formed products-are molded or formed products which can cause incident light to diffuse and go out, and are used in the case where uniform illumination is difficult due to the kind of a light source or a positional relation.

A light-diffusing molded or formed product is generally required to have a high light transmittance and high light diffusion property in combination. For example, in a back light type liquid crystal display, a back light is arranged at the rear of a liquid crystal display panel. As the back light, a vertical type or an edge type is representative. The vertical type back light has a structure that one or plural light sources are arranged just under the liquid crystal display panel, and a light-diffusing plate is arranged over the light source. The edge type back light has a structure that a linear light source is arranged at a side part of a liquid crystal display panel, and a reflector and a light-diffusing plate are arranged in combination. In the back light of any type, it is required that the liquid crystal display panel can be illuminated as uniform diffused light free of any mottle by the outgoing light from the light source so as to prevent the liquid crystal display panel from causing mottle of light and shade. The back light is also required to have uniform and high luminance.

In order for the back light to satisfy such requirements, it is important to improve the light transmittance and light diffusion property of the light-diffusing plate. Further, the light-diffusing plate is required to have excellent light resistance to prevent its performance from being deteriorated due to discoloration or the like even by the outgoing light from the light source over a long period of time.

As described above, the light-diffusing molded or formed products are required to permit uniformly diffusing the outgoing light from the light source almost without causing luminance mottle, mottle of light and shade, periodical mottle of light and shade, and/or the like, have excellent uniformity of luminance, permit the outgoing of the diffused light at high luminance and have excellent light resistance.

More specifically, the light-diffusing molded or formed products must have a high proportion of the outgoing light from the plane of outgoing to the incident light from the plane of incidence, i.e., a high total light transmittance with a parallel ray transmittance combined with a diffused ray transmittance in order to effectively utilize the light from the light source. Therefore, the light-diffusing molded or formed products are required to be hard to reflect and absorb the light on the plane of incidence. From the purpose of diffusing light, the light-diffusing molded or formed products cannot sufficiently fulfill their functions unless the diffused ray transmittance is high.

As the light-diffusing molded or formed products, there have heretofore been proposed, for example, a light-diffusing sheet formed of a transparent resin film containing closed cells having an average particle diameter of 1 to 30 $\mu$m (Japanese Patent Application Laid-Open No. 5-281403) and a light-diffusing molded or formed methacrylic resin to which particles of a crosslinkable polymer and fine silicone particles are added (Japanese Patent Application Laid-Open No. 6-107881).

In these light-diffusing molded or formed products, however, the light transmission property is lowered when the number of the closed cells or fine particles dispersed is increased though the light diffusion property is improved. When the number of the closed cells or fine particles is decreased on the other hand, the light diffusion property is lowered though the light transmission property is improved. As described above, there is an adverse correlation between the light transmission property and the light diffusion property. Therefore, either light transmission property or light diffusion property may become insufficient according to the use. Thus, a light-diffusing molded or formed product high in both light transmission property and light diffusion property is sought in application fields of light-diffusing plates and the like.

In order to solve the above-described problem, Japanese Patent Application Laid-Open No. 8-327806 has proposed a light-diffusing resin composition obtained by dispersing transparent fine polymer particles in a thermoplastic norbornene resin matrix, and a light-diffusing molded or formed product obtained by molding or forming the light-diffusing resin composition. The light-diffusing molded or formed product has become insufficient in light resistance, dimensional stability or the like due to selection or variation of molding or forming conditions in some cases though it is excellent in both light transmission property and light diffusion property.

DISCLOSURE OF THE INVENTION

It is an object of the present invention to provide a light-diffusing resin composition excellent in both light transmission property and light diffusion property and moreover in light resistance.

Another object of the present invention is to provide a light-diffusing molded or formed product excellent in both light transmission property and light diffusion property and moreover in light resistance by using such a light-diffusing resin composition.

The present inventors have carried out an extensive investigation with a view toward achieving the above objects. As a result, the present inventors have conceived a light-diffusing resin composition comprising a specific alicyclic structure-containing resin and transparent fine polymer particles. It has been found that a light-diffusing molded or formed product obtained by molding or forming this light-diffusing resin composition is high in total light transmittance and in diffused ray transmittance (turbidity) at the same time, and moreover excellent in light resistance and hence extremely little in change of chromaticity even upon exposure to light over a long period of time. The present invention has been led to completion on the basis of these findings.

According to the present invention, there is thus provided a light-diffusing resin composition comprising at least one alicyclic structure-containing resin (A) selected from the group consisting of (co)polymers (A1) having repeating units derived from an alicyclic structure-containing ethylenically unsaturated monomer and (co)polymers (A2) having repeating units which are derived from an aromatic vinyl monomer and in which the aromatic rings have been converted to alicyclic structures through hydrogenation after polymerization and transparent fine polymer particles (B).

According to the present invention, there is also provided a light-diffusing molded or formed resin obtained by molding or forming the light-diffusing resin composition.

BEST MODE FOR CARRYING OUT THE INVENTION

The light-diffusing resin composition according to the present invention is a resin composition comprising a specific alicyclic structure-containing resin and transparent fine polymer particles, in which the transparent fine polymer particles are dispersed in a matrix composed of the alicyclic structure-containing resin.

The alicyclic structure-containing resin (A) useful in the practice of the present invention is at least one selected from the group consisting of (co)polymers (A1) having repeating units derived from an alicyclic structure-containing ethylenically unsaturated monomer and (co)polymers (A2) having repeating units which are derived from an aromatic vinyl monomer and in which the aromatic rings have been converted to alicyclic structures through hydrogenation after polymerization. The "repeating units" may hereinafter be referred to as "units" merely.

The (co)polymers (A1) having repeating units derived from the alicyclic structure-containing ethylenically unsaturated monomer are homopolymers of alicyclic structure-containing ethylenically unsaturated monomers or copolymers of the alicyclic structure-containing ethylenically unsaturated monomer and another monomer copolymerizable therewith. Example of the units derived from the alicyclic structure-containing ethylenically unsaturated monomer contained in the (co)polymers (A1) include units having a cycloalkane structure and units having a cycloalkene structure. From the viewpoint of light resistance, however, those containing units having the cycloalkane structure are preferred.

The (co)polymers (A1) used in the present invention may be those composed of only the units of the alicyclic structure-containing ethylenically unsaturated monomer, but may be copolymers containing units derived from another monomer copolymerizable with the alicyclic structure-containing ethylenically unsaturated monomer from the viewpoints of strength and the like of the resulting light-diffusing molded or formed product. In the copolymers, a proportion of the alicyclic structure-containing ethylenically unsaturated monomer units is generally 10 to 99% by weight, preferably 30 to 95% by weight, more preferably 50 to 95% by weight, particularly preferably 70 to 95% by weight.

The (co)polymers (A2) having repeating units which are derived from the aromatic vinyl monomer and in which the aromatic rings have been converted to alicyclic structures through hydrogenation after polymerization are resins obtained by hydrogenating the aromatic rings of aromatic vinyl polymers.

The aromatic vinyl polymers are homopolymers of aromatic vinyl monomers or copolymers of an aromatic vinyl monomer and another monomer copolymerizable therewith. When hydrogenation is conducted after polymerization of the aromatic vinyl monomer, the aromatic rings are converted to alicyclic structures by the hydrogenation. A proportion of the repeating units derived from the aromatic vinyl monomer in the case of the copolymer is generally 10 to 99% by weight, preferably 30 to 95% by weight, more preferably 50 to 95% by weight, particularly preferably 70 to 95% by weight. It is desirable that the kind and copolymerizing proportion of another monomer to be copolymerized be suitably selected according to the strength, optical properties and the like of the resulting resin.

The glass transition temperature (Tg) of the alicyclic structure-containing resin (A) used in the present invention is within a range of generally 70 to 170° C., preferably 110 to 150° C., more preferably 100 to 140° C. If Tg of the resin is too low, the heat resistance of the resulting light-diffusing molded or formed resin tends to be deteriorated. In the present invention, Tg is a value measured by means of a differential scanning calorimeter.

No particular limitation is imposed on the molecular weight of the alicyclic structure-containing resin (A) used in the present invention. However, it is generally 2,000 to 300,000, preferably 3,000 to 250,000, more preferably 20,000 to 200,000 when expressed by a weight average molecular weight (Mw) in terms of polystyrene as determined in the form of a cyclohexane solution by gel permeation chromatography (GPC). When Mw of this resin falls within the above range, the light resistance and dimensional stability of the resulting light-diffusing-molded or formed resin tend to be improved. When the alicyclic structure-containing resin is not dissolved in cyclohexane, however, the molecular weight is determined as a weight average molecular weight in terms of polyisoprene in the form of a toluene solution.

A volatile component in the alicyclic structure-containing resin (A) is preferably reduced to 0.5% by weight or lower from the viewpoints of environmental safety and odor. In the present invention, the amount of the volatile component is an amount of components vaporized when the resin is heated to a temperature of 350° C. from 30° C. by means of a differential thermogravimeter (TG/DTA 200 manufactured by Seiko Instruments Inc.). No particular limitation is imposed on the method of reducing the volatile component, and examples thereof include methods such as solidification with a poor solvent, direct drying, steam stripping, stripping under reduced pressure and nitrogen stripping.

The refractive index of the alicyclic structure-containing resin (A) is within a range of generally 1.4 to 1.6, preferably 1.45 to 1.60, particularly preferably 1.47 to 1.57. When the refractive index of this resin falls within the above range, the light transmission property and light diffusion property of the resulting light-diffusing molded or formed resin are well balanced with each other.

No particular limitation is imposed on the production process of the alicyclic structure-containing resin (A) used in the present invention. However, it can be generally obtained in accordance with (1) a process of subjecting the alicyclic structure-containing ethylenically unsaturated monomer alone or the alicyclic structure-containing ethylenically unsaturated monomer and another monomer copolymerizable therewith to addition (co)polymerization, or (2) a process of subjecting the aromatic vinyl monomer alone or the aromatic vinyl monomer and another monomer copolymerizable therewith to addition (co)polymerization and hydrogenating the aromatic rings of the resultant (co) polymer after the polymerization.

The alicyclic structure-containing ethylenically unsaturated monomer is a polymerizable alicyclic hydrocarbon compound having an ethylenically unsaturated bond. Specific examples of the alicyclic structure-containing ethylenically unsaturated monomer include vinylcycloalkanes such as vinylcyclopentane, vinylcyclohexane, vinylcycloheptane, α-methyl-vinylcyclohexane, vinylmethylcyclohexane and vinylbutylcyclohexane; vinylcycloalkenes such as vinylcyclopentene, vinylcyclohexene, vinylmethylcyclohexene and vinylcyclopentene; cyclopentyl (meth)acrylate, cycloheptyl (meth)acrylate and cyclohexyl (meth)acrylate; and norbornane ring-containing (meth)acrylates such as tetracyclo[4.4.0.1$^{2,5}$.1$^{7,10}$]dodecyl-3-(meth)acrylate, 9-ethyl-tetracyclo[4.4.0.1$^{2,5}$.1$^{7,10}$]dodecyl-3-(meth) acrylate, 9-ethylidenetetracyclo[-4.4.0.1$^{2,5}$.1$^{7,10}$]dodecyl-3-(meth)acrylate, 9 -methyltetracyclo [ 4.4.0.1$^{2,5}$.1$^{7,10}$] dodecyl-3-(meth) acrylate, 8-ethyltetracyclo[4.4.0.1$^{2,5}$.1$^{7,10}$]dodecyl-3-(meth)-acrylate, 8-ethylidenetetracyclo [4.4.0.1$^{2,5}$.1$^{7,10}$]dodecyl-3-(meth)acrylate, 8-methyltetracyclo[4.4.0.1$^{2,5}$.1$^{7,10}$]dodecyl-3-(meth) acrylate, 8,9-ethyltetracyclo[4.4.0.1$^{2,5}$.1$^{7,10}$]-dodecyl-3-(meth)acrylate, 8,9-ethylidenetetracyclo-[4.4.0.1$^{2,5}$.1$^{7,10}$]-dodecyl-3-(meth)acrylate, 8,9-methyltetracyclo-[4.4.0.1$^{2,5}$.1$^{7,10}$]dodecyl- 3-(meth)acrylate, 2,7-dimethyl-tetracyclo[4.4.0.1$^{2,5}$.1$^{7,10}$]dodecyl-3-(meth)acrylate, 2,10-dimethyltetracyclo[4.4.0.1$^{2,5}$.1$^{7,10}$]dodecyl-3-(meth) acrylate, 11,12-dimethyltetracyclo[4.4.0.1$^{2,5}$.1$^{7,10}$]dodecyl-3-(meth)-acrylate, hexacyclo[6,6.1.1$^{3,6}$.1$^{10,13}$.0$^{2,7}$.0$^{9,14}$] heptadecyl-4-(meth)-acrylate, 12-methylhexacyclo [6.6.1.1$^{3,6}$.1$^{10,13}$.0$^{2,7}$.0$^{9,14}$]- heptadecyl-4-(meth)acrylate, 11-methylhexacyclo-[6.6.1.1$^{3,6}$.1$^{10,13}$.0$^{2,7}$.0$^{9,14}$]heptadecyl-4-(meth)acrylate, 12-ethylhexacyclo[6.6.1.1$^{3,6}$.1$^{10,13}$.0$^{2,7}$.0$^{9,14}$]heptadecyl-4-(meth)acrylate, 11-ethylhexacyclo-[6.6.1.1$^{3,6}$.1$^{10,13}$.0$^{2,7}$.0$^{9,14}$]-heptadecyl-4-(meth)acrylate, octacyclo-[8.8.1$^{2,3}$.1$^{4,7}$.1$^{11,18}$.1$^{13,15}$.0.0$^{3,8}$.0$^{12,17}$]docosyl-5-(meth)acrylate, 15-methyloctacyclo[8.8.1$^{2,3}$.1$^{4,7}$.1$^{11,18}$.1$^{13,15}$.0.0$^{3,8}$.0$^{12,17}$]docosyl- 5-(meth)acrylate, pentacyclo [6.6.1.1$^{3,6}$.0$^{2,7}$.0$^{9,14}$]hexadecyl-4-(meth)acrylate, 1,6-dimethylpentacyclo[6.6.1.1$^{3,6}$.0$^{2,7}$.0$^{9,14}$]-hexadecyl-4-(meth)acrylate, 15,16-dimethylpentacyclo-[6.6.1.1$^{3,6}$.0$^{2,7}$.0$^{9,14}$]hexadecyl-4-(meth)acrylate, 1,3-dimethylpentacyclo[6.6.1.1$^{3,6}$.0$^{2,7}$.0$^{9,14}$]hexadecyl-4-(meth)acrylate, pentacyclo[6.5.1.1$^{3,6}$.0$^{2,7}$.0$^{9,13}$] pentadecyl-4-(meth) acrylate, 1,6-dimethylpentacyclo[6.5.1.1$^{3,6}$.0$^{2,7}$.0$^{9,13}$] pentadecyl-4-(meth)acrylate, 1,3-dimethylpentacyclo [6.5.1.1$^{3,6}$.0$^{2,7}$.0$^{9,13}$]pentadecyl-4-(meth)acrylate and 15,16-dimethylpentacyclo-[6.5.1.1$^{3,6}$.0$^{2,7}$.0$^{9,13}$]pentadecyl-4-(meth)acrylate.

Examples of the aromatic vinyl monomer include styrene, α-methylstyrene, p-methylstyrene, t-butylstyrene and vinylnaphthalene.

No particular limitation is imposed on the other monomers so far as they are copolymerizable with the alicyclic structure-containing ethylenically unsaturated monomer and/or the aromatic vinyl monomer. Specific examples of such other monomers include α-olefins such as ethylene, propylene and 4-methyl-1-pentene; conjugated diene monomers such as butadiene and isoprene; ethylenically unsaturated carboxylates such as methyl (meth)acrylate, ethyl (meth)acrylate, 2-ethylhexyl (meth)acrylate and butyl (meth)acrylate; ethylenically unsaturated carboxylic acids such as (meth)acrylic acid, maleic acid and itaconic acid; ethylenically unsaturated nitriles such as acrylonitrile and methacrylonitrile; ethylenically unsaturated carboxylic acid amides such as acrylamide and methacrylamide; and cyclic diene monomers such as norbornadiene and cyclohexadiene.

Among these, α-olefins such as ethylene, conjugated diene monomers such as isoprene, and ethylenically unsaturated carboxylates such as butyl acrylate are preferred.

The amount of the alicyclic structure-containing ethylenically unsaturated monomer and/or the aromatic vinyl monomer is generally 10 to 99% by weight, preferably 30 to 95% by weight, more preferably 50 to.95% by weight, particularly preferably 70 to 95% by weight based on the total weight of the monomers used in polymerization.

The polymerization can be performed in accordance with bulk polymerization, emulsion polymerization, suspension polymerization, solution polymerization or the like using a polymerization initiator such as a radical polymerization catalyst or ionic polymerization catalyst.

The hydrogenation of the aromatic rings of the aromatic vinyl polymer can be performed in accordance with any publicly known hydrogenation process. Specifically, for example, molecular hydrogen is introduced into a melt or solution of the aromatic vinyl polymer, preferably the solution in the presence of a hydrogenation catalyst to subject carbon-carbon double bonds of the aromatic rings to an addition reaction with hydrogen.

Examples of the hydrogenation catalyst include fine powders of noble metals such as ruthenium, rhodium, palladium, platinum and nickel, catalysts with these noble metals carried on a support such as activated carbon, diatomaceous earth, alumina or silica, and catalysts obtained by reducing a complex of a transition metal element such as chromium or cobalt, which has been solubilized in an organic solvent, with an alkyl metal compound.

As the solvent used in the solution of the aromatic vinyl polymer, any solvent may be used so far as it can dissolve a resin obtained by the hydrogenation reaction therein and does not become a catalyst poison to the hydrogenation catalyst. Specific examples of such a solvent include cycloalkanes such as cyclohexane; and alkanes such as n-hexane. A polar compound such as an alcohol or ketone may be added to the solvent for the purpose of controlling the viscosity of the solvent and a reaction velocity.

No particular limitation is imposed on the rate (degree) of hydrogenation of the aromatic rings of the aromatic vinyl polymer. However, it is generally 50 to 100%, preferably 80 to 100%, more preferably 90 to 100% from the viewpoints of optical properties and light resistance.

The light-diffusing resin composition according to the present invention may contain other resins than the alicyclic structure-containing resin if desired. Specific examples of the other resins include polyester resins, conjugated diene polymers, conjugated diene monomer/(meth)-acrylate copolymers, aromatic vinyl monomer/(meth)acrylate copolymers and (meth)acrylate polymers. No particular limitation is imposed on the amount of the other resins blended so far as it falls within the limit not impeding the objects of the present invention. However, it is generally at most 50% by weight, preferably at most 40% by weight, more preferably at most 30% by weight, particularly preferably at most 20% by weight based on the total weight of the resin components.

No particular limitation is imposed on the polymer forming the transparent fine polymer particles (B) useful in the practice of the present invention so far as it is transparent. However, it preferably has high light transmission property. Specifically, a polymer that the total light transmittance of a plate-like molded product having a thickness of 1 mm molded from the polymer is at least 70% is preferred, a polymer that the transmittance is at least 80% is more preferred, and a polymer that the transmittance is at least 90% is particularly preferred. If the light transmission property of the polymer is too low, illuminating energy of a light source is wasted due to light loss in the interiors of the fine polymer particles, and the light transmission property of the resulting molded or formed resin is lowered. Incidentally, the total light transmittance is generally a value measured with visible light in a wavelength range of 400 to 700 nm. When light to be transmitted and diffused is in a wavelength range outside the above range, however, the polymer preferably has the above-described total light transmittance within such a wavelength range.

No particular limitation is imposed on the refractive index of the transparent fine polymer particles. Supposing that a refractive index of the resin forming the matrix is n1, and a refractive index of the polymer forming the fine polymer particles is n2, however, the lower limit of n1/n2 or n2/n1 is preferably 1.01, more preferably 1.015, particularly preferably 1.025. The upper limit thereof is preferably 1.2, more preferably 1.1. The ratio between the refractive indices is calculated by putting a greater value between n1 and n2 in a numerator and the smaller value in a denominator. The refractive index n2 of the polymer forming the fine polymer particles is generally 1.4 to 1.8, preferably 1.42 to 1.72, particularly preferably 1.43 to 1.59.

If this refractive index is too low, the refraction of the light at an interface between the matrix-resin and the transparent fine polymer particles becomes too small, so that the light diffusion property of the resulting molded or formed product tends to be lowered. If the refractive index is too high, the refraction of the light at the interface becomes too great, so that the light transmission property of the resulting molded or formed product tends to be lowered because, for example, a part of the outgoing light from the light source is reflected on the incident side. The refractive index is a value measured in a wavelength range as necessary for the end application intended like the total light transmittance. The refractive index varies according to the kind of the polymer used. In the case where the polymer is a copolymer, the refractive index of the copolymer can be controlled by the amount of, for example, a phenyl group-containing monomer used, or the like. In general, the refractive index of the resulting copolymer becomes higher as the amount of the phenyl group-containing monomer used increases.

The transparent fine polymer particles are required to retain the form of the fine particles in the matrix composed of the alicyclic structure-containing resin. If the form of the fine particles cannot be retained, any molded or formed product having-uniform light diffusion property cannot be obtained. Therefore, the polymer forming the fine polymer particles is preferably crosslinked.

Examples of the polymer forming the transparent fine polymer particles include those obtained by homopolymerizing or copolymerizing a vinyl monomer such as styrene or acrylonitrile; or a (meth)acrylate monomer such as methyl (meth)acrylate, ethyl (meth)acrylate or butyl (meth)acrylate, those obtained by copolymerizing such a monomer and a polyfunctional monomer copolymerizable therewith, such as diethylene glycol di(meth)acrylate, 1,3-butylene glycol di(meth)acrylate or divinylbenzene, and polysiloxane polymers. A polymer crosslinkable upon polymerization like the copolymer obtained by adding the polyfunctional monomer before copolymerization is preferably provided in the form of crosslinked fine particles by polymerization. Fine polymer particles crosslinked by a method such as ultraviolet irradiation after forming a polymer into fine particles after polymerization or after forming fine particles by polymerization may also be used.

Specific examples of the fine polymer particles include fine particles of crosslinked polymethyl methacrylate, crosslinked polystyrene, crosslinked sodium polyacrylate, crosslinked silicones, crosslinked acrylic-styrene copolymers, crosslinked polymethylsyl sesquioxane, etc. Among these, fine particles of crosslinked polystyrene, polysiloxane polymers (silicone resins) and crosslinked polysiloxane are preferred.

No particular limitation is imposed on the process for forming the transparent fine polymer particles used in the present invention. However, it is preferable to form fine particles by a process such as suspension polymerization. Specifically, crosslinked fine polymer particles are obtained by, for example, subjecting a monomer mixture containing a polyfunctional monomer to suspension polymerization like copolymerization of styrene and divinylbenzene. Crosslinked fine polymer particles having a desired particle diameter distribution are provided by washing, drying and classification using an air micron separator after the polymerization.

No particular limitation is imposed on the particle diameter of the fine polymer particles. However, the lower limit of the average particle diameter is preferably 1 μm, more preferably 3 μm, particularly preferably 4 μm. The upper limit of the average particle diameter is preferably 30 μm, more preferably 20 μm, particularly preferably 15 μm. If the average particle diameter of the fine polymer particles is too small, the light transmission property of the resulting resin composition tends to be lowered though its light diffusion property is enhanced. If the average particle diameter of the fine polymer particles is too great, the light diffusion property of the resulting resin composition tends to be lowered though its light transmission property is enhanced. In addition, in some cases, the surface smoothness of the resulting molded or formed product may be deteriorated, or mottle may occur.

The fine polymer particles used in the present invention are preferably spherical. The term "spherical" means that a ratio of breadth/length of fine particles is preferably at least 0.6, more preferably at least 0.8, particularly preferably at least 0.9, and no corner is present. The breadth means the smallest diameter of a fine particle, while the length means the greatest diameter thereof. A proportion of spherical fine particle in the fine polymer particles is preferably at least 80%, more preferably at least 90%, particularly preferably at least 95%. The breadth, length, average particle diameter and the presence of corners may be determined on the basis of the image of a microphotograph. If non-spherical fine particles are present in plenty, dispersion becomes uneven upon preparation of the resin composition, or the resulting resin composition has orientation property, so that it is difficult to obtain a molded or formed product having uniform light diffusion property upon molding or forming.

There is no need for the fine particles used in the present invention to be one kind, and plural kinds of fine particles may be used in combination to control the balance between light transmission property and light diffusion property of the resulting resin composition. An inorganic filler may also be used according to service environment.

The amount of the transparent fine polymer particles blended varies according to the optical path length of the intended light-diffusing molded or formed product. However, it is generally selected from within a range of 0.01 to 30% by weight. In, for example, a light-diffusing plate having a thickness of 100 μm, the amount of the fine polymer particles blended is generally 10 to 30% by weight. It is generally 1 to 10% by weight for a light-diffusing plate having a thickness of 1 mm, 0.1 to 1% by weight for a light-diffusing plate having a thickness of 10 mm, or 0.01 to 0.1% by weight for a light-diffusing plate having a thickness of 100 mm.

When the optical path length of the molded or formed product is short (thin in thickness), satisfactory light diffusion property is not achieved unless the transparent fine polymer particles are blended in plenty. When the optical path length of the molded or formed product is long (thick in thickness) on the other hand, the light transmission property is lowered even when only a small amount of the transparent fine polymer particles is blended, and so the amount of the transparent fine polymer particles blended must be controlled.

To the light-diffusing resin composition according to the present invention, various kinds of additives may be added within the limit not impeding the objects of the present invention as needed. Examples of the additives include antioxidants of phenolic and phosphoric types, etc.; ultraviolet absorbents of benzophenone and benzotriazole types, etc.; light stabilizers of hindered amine type, etc.; antistatic agents of cationic, anionic and nonionic types, etc.; carbonaceous or metallic and powdered or fibrous conductivity-imparting agents; lubricants such as esters of aliphatic alcohols, and partial esters and partial ethers of polyhydric alcohols; etc. Sliding agents such as graphite and fluorine-containing resin powder may also be added. A blue colorant (bluing agent) may also be added in order to prevent appearance failure caused by yellowing due to deterioration of the resin.

No particular limitation is imposed on the method of preparing the resin composition, and the preparation may be performed in accordance with the conventional method, for example, twin-screw kneading. The resin composition is preferably such that the transparent fine polymer particles are uniformly dispersed in the alicyclic structure-containing resin. When the fine polymer particles are not uniformly dispersed due to aggregation or the like, the resulting molded or formed product tends to cause mottle in its light diffusion property and light transmission property.

No particular limitation is imposed on the method of molding or forming the light-diffusing resin composition according to the present invention, and injection molding, extrusion, pressure forming, vacuum forming, hot-press forming or the like, which is a general molding or forming method for thermoplastic resins, is used.

The light-diffusing molded or formed resin according to the present invention is obtained by molding or forming the light-diffusing resin composition according to the present invention and may be shaped in any form as necessary for the end application intended. As the most general use, may be mentioned a light-diffusing plate used in a back light type liquid crystal display or the like. This light-diffusing plate is arranged between a light source and a target to be illuminated and serves to cause the light from the light source to uniformly go out so as to make light and shade at the illuminated surface uniform. Other uses include antireflection films, light-diffusing films, illumination covers, reflection type screens, transmission type screens, etc.

EXAMPLES

The present invention will hereinafter be described more specifically by the following Examples and Comparative Examples. Fine polymer particles (beads) used in the examples and comparative examples all contain particles, the ratio of breadth/length of which is at least 0.9, in a proportion of at least 95% based on the total fine particles.

Example 1

After 90 parts by weight of styrene and 10 parts by weight of isoprene were copolymerized, the aromatic rings of the resultant copolymer were hydrogenated to obtain an alicyclic structure-containing resin (A-1) having a rate of hydrogenation of 99.8%. The resin (A-1) had Mw of about 130,000 and Tg of about 124° C. The content of a volatile component in the resin (A-1) was 0.12% by weight, and its refractive index was 1.5106.

One hundred parts by weight of the alicyclic structure-containing resin (A-1) and 5 parts by weight of truly spherical crosslinked polystyrene beads (Techpolymer SBX-8, product of Sekisui Plastics Co., Ltd.; average particle diameter=about 8 μm; refractive index=1.59) were kneaded at a resin temperature of 250° C. by means of a twin-screw extruder (TEM35B, manufactured by Toshiba Machine Co., Ltd.) to obtain a resin composition. This resin composition was pelletized by a pelletizer. After the resultant pellets were predried, a flat plate having a thickness of 2 mm was produced by injection molding.

Measuring Methods of Physical Properties

The total light transmittance and turbidity (diffused ray transmittance) of this flat plate were determined by means of a turbidimeter (NDH-300A, manufactured by Nippon Denshoku Kogyo K.K.). This flat plate was exposed to light for 500 hours to determine changes in chromaticity every 100 hours by means of a Fade-Ometer. The results are shown in Table 1.

Incidentally, the Izod impact strength (notched) of a flat plate in which the concentration of the truly spherical crosslinked polystyrene beads was 5% by weight was determined in accordance with ASTM D 256 and found to be 2.5 kgf·cm/cm.

Example 2

One hundred parts by weight of the alicyclic structure-containing resin (A-1) and 5 parts by weight of truly spherical crosslinked silicone resin beads (Tospearl 145, product of Toshiba-Silicone Co., Ltd.; average particle diameter=about 4.5 μm; refractive index=1.43) were kneaded in the same manner as in Example 1 to prepare a resin composition, and the resin composition was then pelletized. The resultant pellets were used to produce a flat plate having a thickness of 2. mm. The evaluation results of this flat plate are shown in Table 1.

Example 3

After 90 parts by weight of styrene and 10 parts by weight of butyl acrylate were copolymerized, the aromatic rings of the resultant copolymer were hydrogenated to obtain an alicyclic structure-containing resin (A-2) having a rate of hydrogenation of 99.8%. The resin (A-2) had Mw of about 100,000 and Tg of 130° C. The content of a volatile component in the resin (A-2) was 0.24% by weight, and its refractive index was 1.5044.

A resin composition and a flat plate were obtained in the same manner as in Example 2 except that the resin (A-2) was used in place of the resin (A-1). The results are shown in Table 1.

Example 4

Eighty 80 parts by weight of vinylcyclohexane and 20 parts by weight of ethylene were copolymerized to obtain a copolymer [alicyclic structure-containing resin (A-3)]. The alicyclic structure-containing resin (A-3) had Mw of about 51,000. The content of a volatile component in the resin (A-3) was 0.11% by weight, and its refractive index was 1.5131.

A resin composition and a flat plate were obtained in the same manner as in Example 2 except that the resin (A-3) was used in place of the resin. (A-1). The results are shown in Table 1.

Comparative Example 1

A resin composition and a flat plate were obtained in the same manner as in Example 1 except that an ethylene-norbornene addition polymer (Mw=24,000, Tg=72° C., norbornene content=47%, volatile component content=0.16% by weight, refractive index =1.5295) was used in place of the resin (A-1). The results are shown in Table 1.

TABLE 1

|  | Ex. 1 | Ex. 2 | Ex. 3 | Ex. 4 | Comp. Ex. 1 |
|---|---|---|---|---|---|
| [Light transmission property] Total light transmittance | 53% | 60% | 58% | 55% | 48% |
| [Light diffusion property] Diffused ray transmittance | 92% | 95% | 93% | 93% | 87% |
| [Light resistance] Chromaticity y (reflection) | | | | | |
| At the beginning of test | 0.314 | 0.314 | 0.314 | 0.314 | 0.314 |
| After 100 hours | 0.314 | 0.314 | 0.314 | 0.314 | 0.315 |
| After 200 hours | 0.315 | 0.315 | 0.315 | 0.315 | 0.317 |
| After 300 hours | 0.315 | 0.315 | 0.315 | 0.315 | 0.318 |
| After 400 hours | 0.315 | 0.315 | 0.316 | 0.316 | 0.320 |
| After 500 hours | 0.316 | 0.315 | 0.316 | 0.317 | 0.331 |

INDUSTRIAL APPLICABILITY

According to the present invention, light-diffusing resin compositions excellent in both light transmission property and light diffusion property and moreover in light resistance are provided. According to the present invention, light-diffusing molded or formed products obtained by molding or forming such a light-diffusing resin composition into various molded or formed products such as sheets (plates) are also provided. The light-diffusing molded or formed resins according to the present invention are excellent in the balance between light transmission property and light diffusion property and light resistance, far excellent in light diffusion property compared with the conventional light-diffusing molded or formed resins having almost the same light transmission property and far excellent in light transmission property compared with the conventional light-diffusing molded or formed resins having almost the same light diffusion property. The light-diffusing molded or formed resins according to the present invention can be used in a wide variety of fields of light-diffusing plates in liquid crystal displays, and the like.

What is claimed is:

1. A light-diffusing resin composition comprising at least one alicyclic structure-containing resin (A) selected from the group consisting of (co)polymers (A1) having repeating units derived from an alicyclic structure-containing ethylenically unsaturated monomer and (co)polymers (A2) having repeating units which are derived from an aromatic vinyl monomer and in which the aromatic rings have been converted to alicyclic structures through hydrogenation after polymerization and transparent fine polymer particles (B).

2. The light-diffusing resin composition according to claim 1, wherein the alicyclic structure-containing ethylenically unsaturated monomer is a vinylcycloalkane.

3. The light-diffusing resin composition according to claim 1, wherein the (co)polymer (A1) is a copolymer of the alicyclic structure-containing ethylenically unsaturated monomer and another monomer copolymerizable therewith.

4. The light-diffusing resin composition according to claim 3, wherein a proportion of the alicyclic structure-containing ethylenically unsaturated monomer in the copolymer is 10 to 99% by weight.

5. The light-diffusing resin composition according to claim 3, wherein the copolymerizable another monomer is at least one selected from the group consisting of α-olefins, conjugated diene monomers and ethylenically unsaturated carboxylates.

6. The light-diffusing resin composition according to claim 1, wherein the (co)polymer (A2) is a resin obtained by hydrogenating the aromatic rings of an aromatic vinyl polymer selected from homopolymers of aromatic vinyl monomers and copolymers of an aromatic vinyl monomer and another monomer copolymerizable therewith.

7. The light-diffusing resin composition according to claim 1, wherein the aromatic vinyl monomer is styrene.

8. The light-diffusing resin composition according to claim 6, wherein a proportion of the aromatic vinyl monomer in the copolymer is 10 to 99% by weight.

9. The light-diffusing resin composition according to claim 6, wherein the copolymerizable another monomer is at least one selected from the group consisting of conjugated diene monomers and ethylenically unsaturated carboxylates.

10. The light-diffusing resin composition according to claim 1, wherein a glass transition temperature of the alicyclic structure-containing resin (A) is 70 to 170° C.

11. The light-diffusing resin composition according to claim 1, wherein a weight average molecular weight of the alicyclic structure-containing resin (A) is 2,000 to 300,000.

12. The light-diffusing resin composition according to claim 1, wherein the content of a volatile component in the alicyclic structure-containing resin (A) is at most 0.5% by weight.

13. The light-diffusing resin composition according to claim 1, wherein a refractive index of the alicyclic structure-containing resin (A) is 1.4 to 1.6.

14. The light-diffusing resin composition according to claim 1, wherein supposing that a refractive index of the alicyclic structure-containing resin (A) is n1, and a refractive index of the transparent fine polymer particles (B) is n2, the lower limit of n1/n2 or n2/n1 is 1.01, and the upper limit thereof is 1.2.

15. The light-diffusing resin composition according to claim 1, wherein the lower limit of the average particle diameter of the transparent fine polymer particles (B) is 1 μm, and the upper limit thereof is 30 μm.

16. The light-diffusing resin composition according to claim 1, wherein the transparent fine polymer particles (B) are spherical.

17. The light-diffusing resin composition according to claim 1, wherein a content of the transparent fine polymer particles (B) is 0.01 to 30% by weight.

18. The light-diffusing resin composition according to claim 1, wherein the transparent fine polymer particles (B) are fine particles. of crosslinked polystyrene or crosslinked silicone resin.

19. A light-diffusing molded or formed resin obtained by molding or forming the light-diffusing resin composition according to any one of the foregoing claims.

20. The light-diffusing molded or formed resin according to claim 19, which is a light-diffusing plate in a liquid crystal display.

* * * * *